UNITED STATES PATENT OFFICE.

WILLIAM HENRY BALMAIN, OF ST. HELEN'S, GREAT BRITAIN.

IMPROVEMENT IN THE MANUFACTURE OF BICARBONATE OF SODA.

Specification forming part of Letters Patent No. 116,664, dated July 4, 1871.

*To all whom it may concern:*

Be it known that I, WILLIAM HENRY BALMAIN, of St. Helen's, in the county of Lancaster, in the Kingdom of Great Britain and Ireland, have invented certain mprovements in the preparation of soda and its various salts in a high degree of purity, of which the following is a specification:

I have discovered that bicarbonate of soda is almost insoluble in a saturated solution of salt or of sulphate of soda, or in a solution of the two together, so that bicarbonate of soda may be purified with a loss of only about one per cent. by simple washing by letting water percolate through it. I have availed myself of this fact as furnishing not only a ready means of obtaining bicarbonate of soda free from chloride and sulphate, but also as an economical and profitable method of obtaining in a state of great purity the simple carbonate, the caustic alkali, and other salts of soda produced therefrom, where great purity is a desideratum.

According to my invention I take ordinary soda-ash, or what is called black-ash liquor, or that form of sodium carbonate which is technically called "salts," or any other carbonate of soda, whether native or artificial, and of any degree of purity; or I take any form of caustic soda and convert any one of them into bicarbonate by exposing either a solution of the same or the carbonate of soda in a solid form to carbonic acid. The carbonic acid may be derived from a lime-kiln or the products of fermentation, or from other sources or processes, or it may be prepared specially by any of the known processes. The carbonate of soda, if in the solid form, may be placed in a chamber, with or without shelves, to be exposed to the carbonic acid; or it may be exposed in a revolving cylinder, or in any other convenient manner; but to facilitate the absorption it should contain at least one-half of its own weight of water, which can be added to it if not already present. If the carbonate of soda is in solution or in a liquid state it should be concentrated to saturation, and it may be exposed in a revolving cylinder or in an agitator, or in any other convenient manner, to the carbonic acid; or carbonic acid may be pumped or drawn or otherwise driven through it.

Having thus obtained a bicarbonate of soda in an impure state, I place it in an ordinary drainer of any convenient form, and just put so much water upon it as will cover it, which water is allowed to stand for about one hour or more, as may be required, and is then allowed to drain off, it being followed by a little additional water, which is spread over the top of the material so as to follow the first in descent. These drainings are watched and divided at that point at which the proportion of bicarbonate contained in solution becomes such as to be considered worth saving. The first portions may be rejected altogether, or may be used to produce crystals of sulphate of soda, and the second portion may be used instead of water for the next operation.

When drained the purified bicarbonate may be employed either as such, or be converted into a carbonate by furnacing or other convenient means; or it may be converted into caustic soda, or into any other salts of soda that it may be desired to obtain economically in a high state of purity.

My claim is for—

The process of treating bicarbonate of soda and its salts, substantially as described.

In testimony whereof I have signed my name to this specification in the presence of two subscribing witnesses.

WILLIAM HENRY BALMAIN.

Witnesses:

GEO. FRED. CLARKE,
    4 *Cook street, Liverpool.*
EDWD. W. MILLER,
    153 *Grove street, Liverpool.*